W. B. CLEVELAND.
RAIL BOND PROTECTOR.
APPLICATION FILED OCT. 28, 1907.
911,209.
Patented Feb. 2, 1909.
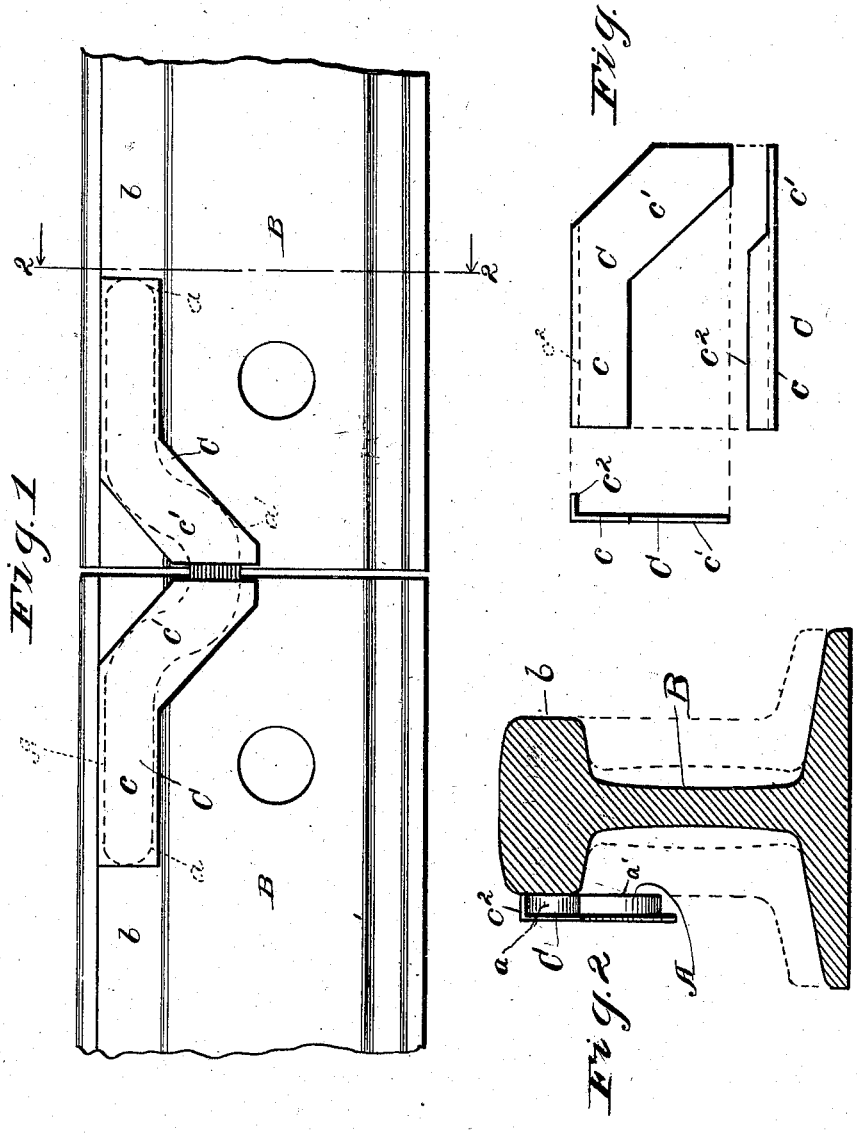
Witnesses:
Mary Israel
E. R. Rodd.
Inventor:
William B. Cleveland
by J. B. Fay
Attorney

UNITED STATES PATENT OFFICE.

WILLIAM B. CLEVELAND, OF CLEVELAND, OHIO, ASSIGNOR TO THE ELECTRIC RAILWAY IMPROVEMENT COMPANY, OF CLEVELAND, OHIO, A CORPORATION OF OHIO.

RAIL-BOND PROTECTOR.

No. 911,209.     Specification of Letters Patent.     Patented Feb. 2, 1909.

Application filed October 28, 1907. Serial No. 399,596.

*To all whom it may concern:*

Be it known that I, WILLIAM B. CLEVELAND, a citizen of the United States, resident of Cleveland, county of Cuyahoga, and State of Ohio, have invented a new and useful Improvement in Rail-Bond Protectors, of which the following is a specification, the principle of the invention being herein explained, and the best mode in which I have contemplated applying that principle, so as to distinguish it from other inventions.

This improvement relates to a device for use primarily in connection with rail bonds of the laminated type, and more particularly with bonds of this type designed to be attached laterally of the rails. Such bonds are to this end usually formed with extending terminal portions adapted to be attached to the respective rail-ends and with an arched intermediate portion whereby longitudinal movement of the rails, owing to their alternate contraction and expansion under changing temperature conditions, is permitted; as also vertical movement relative to each other occasioned by the passage of cars over the joint. Such lateral attachment of the bond terminals is usually had against the outer side of the head or ball of the rail, preferably by soldering, brazing or welding, depending upon the method of bonding employed. This type of bond has for various reasons, which need not be entered upon, become quite popular and would undoubtedly prove still more so were it not for the objection that the bond is left in a more or less exposed condition. The liability to stripping arises not from the wheels of the cars, since their flanges rest on the other side of the rail, but from the chance passage of the wheels of other vehicles, as wagons and the like, which may, if they do not actually break off the bond, at least mutilate it so as to impair its efficiency.

It is with a view to provide a simple and effective protection for bonds of the above general class that the present invention has been devised.

Said invention, to this end, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 represents a side elevation of the abutting ends of two rails electrically joined by a suitable rail bond, my improved protective device being shown in connection with the latter; Fig. 2 is an end view of such attached bond and protective device viewed in the direction indicated by the line 2—2 Fig. 1; and Fig. 3 represents inclusively, and in the order named, an end view, a side elevation, and a plan of one of the two members that constitute such protective device.

In view of what has been said above the bond A shown in Fig. 1, as connecting the abutting ends of rails B B, will be recognized as being of the laminated type, consisting, in other words, of a narrow flat strand of copper wound around upon itself to form a flat laminated strip which is thereupon bent to present laterally extending feet $a$ and an enlarged intermediate portion $a'$. In the mode of attachment here contemplated such terminal portions $a$ $a$ are either soldered or brazed to the sides of heads $b$ of the respective rails by any suitable means. Having been thus attached the protective device constituting the present invention is thereupon superimposed upon the said terminal portions and either soldered or brazed thereto by the same means. Such protective device comprises two complementary members C C each of which, regarding the same as in position upon the bond, comprises a horizontally extending end $c$ and a portion $c'$ inclining downwardly therefrom. End portion $c$ has its upper edge bent inwardly to form a flange $c^2$ that in the attached position of the device serves to cover the upper edge of the bond terminal, Fig. 2. When thus attached the end portion $c$ is designed to cover the face of the said terminal portion and inclined portion $c'$ to extend laterally along the corresponding half of the arched intermediate portion of the bond.

In attaching the protective device, member C is introduced in the clamping mechanism, such as is ordinarily employed in one form or another to attach the bond, just after the bond terminal has been soldered or brazed on, a suitable cementing material having been interposed between the outer face of the terminal and the plate C. It is a matter of but a few seconds additional time to effect such attachment, since the parts are already heated. Once attached the advantages arising from such protective plate are so readily apparent as to make unnecessary any discussion thereof. Since only the end c of the plate C is rigidly affixed, the remainder extending loosely along the intermediate portion of the bond, the freedom of movement of the latter, such as is necessary to accommodate it to the several movements of the rails, referred to before, is in no wise interfered with. Should, however, a vehicle wheel, or other like agent, by accident come in contact with the bond it strikes not the soft yielding copper that constitutes the material of such bond, but instead the shield of steel that is afforded by my improved protective device; consequently the liability to damage is very materially decreased.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. A rail bond for a rail having a protecting armor of harder material, the bond being welded to the armor and to the rail.

2. A rail bond for the head of a rail having a protecting armor of harder material, the bond being welded to the armor and to the rail head.

3. The combination with a rail-bond, of a protective plate of relatively more durable material fixedly attached to its terminal portion and bent over to cover the top of the same.

4. The combination with a rail-bond comprising terminal portions and a flexible intermediate portion; of a protective plate for said bond fixedly secured relatively to a terminal portion of the same but leaving such intermediate portion free.

5. The combination with a rail-bond comprising terminal portions and a flexible intermediate portion; of a protective plate for said bond fixedly attached to a terminal portion of the same but leaving such intermediate portion free.

6. The combination of the abutting ends of two rails; a rail-bond comprising terminal portions attached to said rail ends, respectively, and a flexible intermediate portion; and protective plates for said bond fixedly secured relatively to said rail ends and the corresponding bond terminals, respectively, but only loosely applied to the intermediate portion of said bond.

7. The combination of the abutting ends of two rails; a rail-bond comprising terminal portions attached to said rail ends, respectively, and a flexible intermediate portion; and protective plates for said bond respectively fixedly attached to the terminal portions of said bond but only loosely applied to the corresponding parts of the intermediate portion of said bond.

8. The combination of the abutting ends of two rails; a rail-bond comprising terminal portions attached to said rail ends, respectively, and a flexible intermediate portion; and protective plates respectively fixedly attached to the terminal portions of said bond and bent over to cover the top of the same.

9. The combination with a copper railbond, of a protective plate of steel fixedly attached to its terminal portion and bent over to cover that edge of the same exposed to blows when applied.

10. The combination of the abutting ends of two rails; a copper rail-bond comprising terminal portions attached to said rail ends, respectively, and a flexible intermediate portion; and protective plates of steel fixedly secured relatively to said rail ends and bent over to cover the top of the corresponding bond terminals, respectively, said plates being extended along but only loosely applied to the intermediate portion of said bond.

11. The combination of the abutting ends of two rails; a copper rail-bond comprising terminal portions attached to said rail ends, respectively, and a flexible intermediate portion; and protective plates of steel respectively fixedly attached to the terminal portions of said bond and bent over to cover the top of the same, said plates being extended along but only loosely applied to the intermediate portion of said bond.

12. As a new article of manufacture, a rail-bond protector, comprising a plate of relatively more durable material adapted for attachment to a laterally extending terminal of such bond, such end being bent over to cover the top of such terminal portion, substantially as described.

13. As a new article of manufacture, a protector for rail-bonds of the character described, comprising a plate of relatively more durable material having one end adapted for attachment to a laterally extending terminal of such bond, such end being bent over to cover the top of such terminal portion and the remainder of said plate extending in an angular direction from such end so as to lie substantially parallel with and loosely against the corresponding part of the arched intermediate portion of said bond, substantially as described.

14. As a new article of manufacture, a rail-bond protector, comprising two complementary plates of relatively more durable material than the bond, each plate having one end adapted for attachment to a laterally extending terminal of such bond and bent over to cover the top of the same, the remainder of said plate extending in an angular direction from such end so as to lie substantially parallel with and loosely against the corresponding portion of said bond, substantially as described.

Signed by me this 26th day of October, 1907.

WILLIAM B. CLEVELAND.

Attested by—
 D. L. DAVIES,
 MARY ISRAEL.